May 26, 1964 C. L. BAYER ETAL 3,134,508
FLUID METERING METHOD AND APPARATUS
Filed Oct. 20, 1960 3 Sheets-Sheet 1

INVENTORS
CHRISTIAN L. BAYER
NORMAN E. HOLM
BY
ATTORNEY

May 26, 1964  C. L. BAYER ETAL  3,134,508
FLUID METERING METHOD AND APPARATUS
Filed Oct. 20, 1960  3 Sheets-Sheet 2

INVENTORS
CHRISTIAN L. BAYER
NORMAN ENHOLM
BY
ATTORNEY

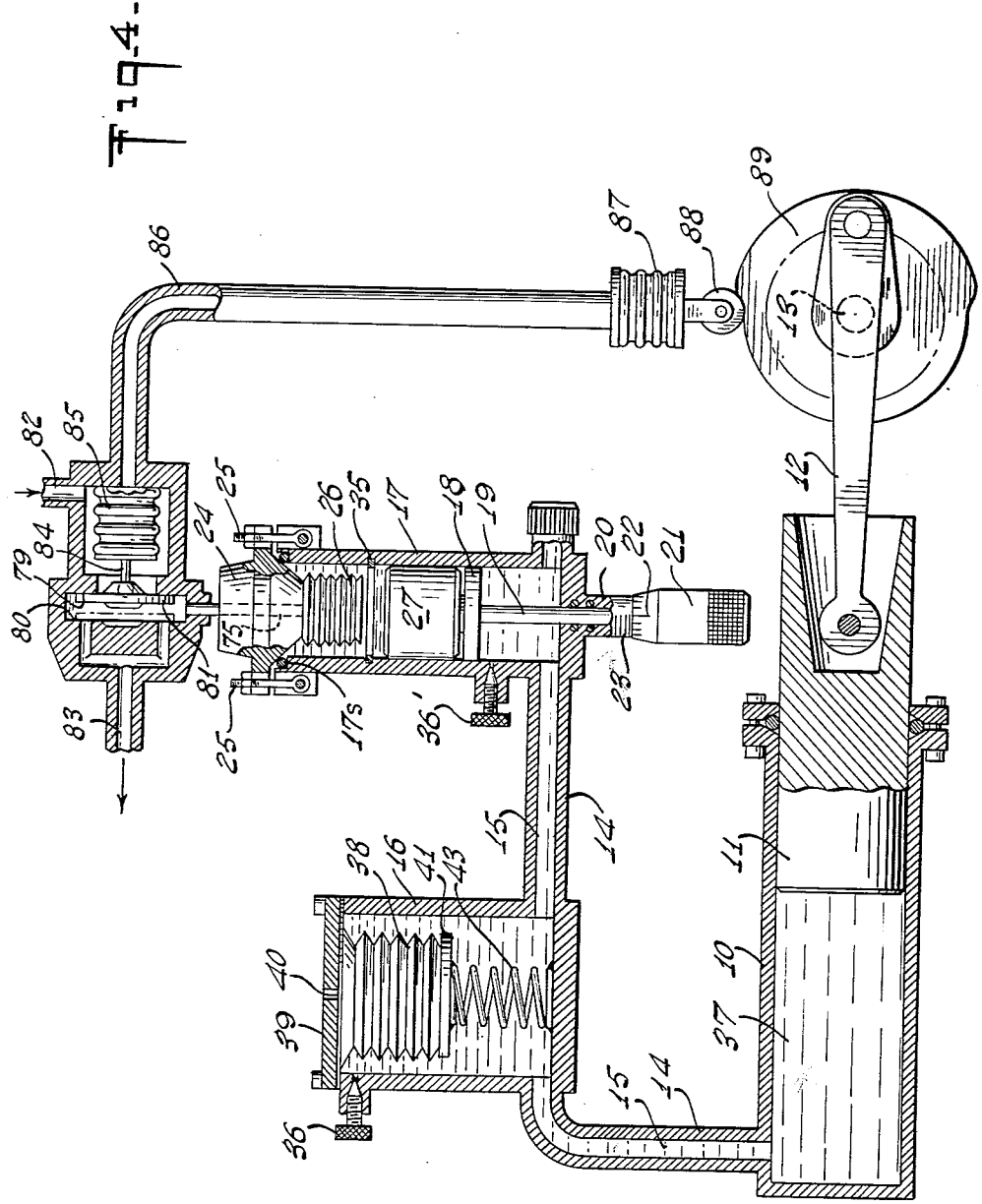

United States Patent Office 3,134,508
Patented May 26, 1964

3,134,508
FLUID METERING METHOD AND APPARATUS
Christian L. Bayer, 7 Winchester Ave., Yonkers, N.Y., and Norman EnHolm, Chappaqua Road, Briarcliff Hills, N.Y.
Filed Oct. 20, 1960, Ser. No. 63,797
11 Claims. (Cl. 222—135)

The present invention relates to improvements in fluid metering and proportioning apparatus.

Metering devices for the delivery of measured quantities of fluids include various forms of adjustable output pumps of which direct acting and diaphragm pumps are two principal types. Both these pumps involve operational drawbacks by reason of mechanical complication as well as the difficulty or impossibility of obtaining and maintaining accurate metering adjustment. These difficulties are obviously multiplied or compounded in systems intended to produce mixtures of different fluids in proportionally graduated amounts normally calling for the use of a number of complete individual pumps or the practical mechanical equivalent thereof. The same drawbacks apply to other types of known pumps intended for use in metering liquids.

This invention overcomes the above and other disadvantages of prior known metering devices and provides a novel and improved apparatus and method for metering one or more liquids that is characterized by its precision, reliability, simplicity and ease of adjustment to produce selected rates of flow of the fluids being metered.

Another object of the invention resides in the provision of an improved hydraulic metering device wherein the stroke of the pumping element is determined by accurately spaced mechanical stops.

A further object resides in the provision of a fluid metering device in which adjustment of the metering stroke may be made with substantially micrometric precision either when the device is in operation or at rest.

A further object of the invention resides in the provision of a metering device including a plurality of individually adjustable metering units all hydraulically operable by means of a single master piston or plunger.

A still further object of the invention resides in the provision of hydraulically operated metering apparatus having compensating means within the hydraulic system responsive to pressure variations which avoids the need for modifying the hydraulic fluid content of the system when changes in adjustment of the metering strokes are made and whereby positive completion of each metering stroke is assured at all times.

A further object of the invention resides in the provision of a novel and improved metering device to dispense selectively mixed or unmixed chemicals, beverages and the like, such for example as coffee, black, or in any selected combination with sugar and cream.

A still further object of the invention resides in the provision of a novel and improved method for metering one or more fluids substantially simultaneously.

Other objects and advantages of the invention will become evident during the course of the following description in connection with the accompanying drawings, in which FIG. 1 is a schematic view in partial section, of one embodiment of the invention;

FIG. 2 is a diagrammatic illustration of an embodiment suitable for dispensing coffee mixtures or the like;

FIG. 3 illustrates typical contours of the cooperative mixture selecting cams indicated in FIG. 2; and FIG. 4 shows an alternative form of an inlet and outlet valve structure for a metering device in accordance with the invention.

Figure 1:
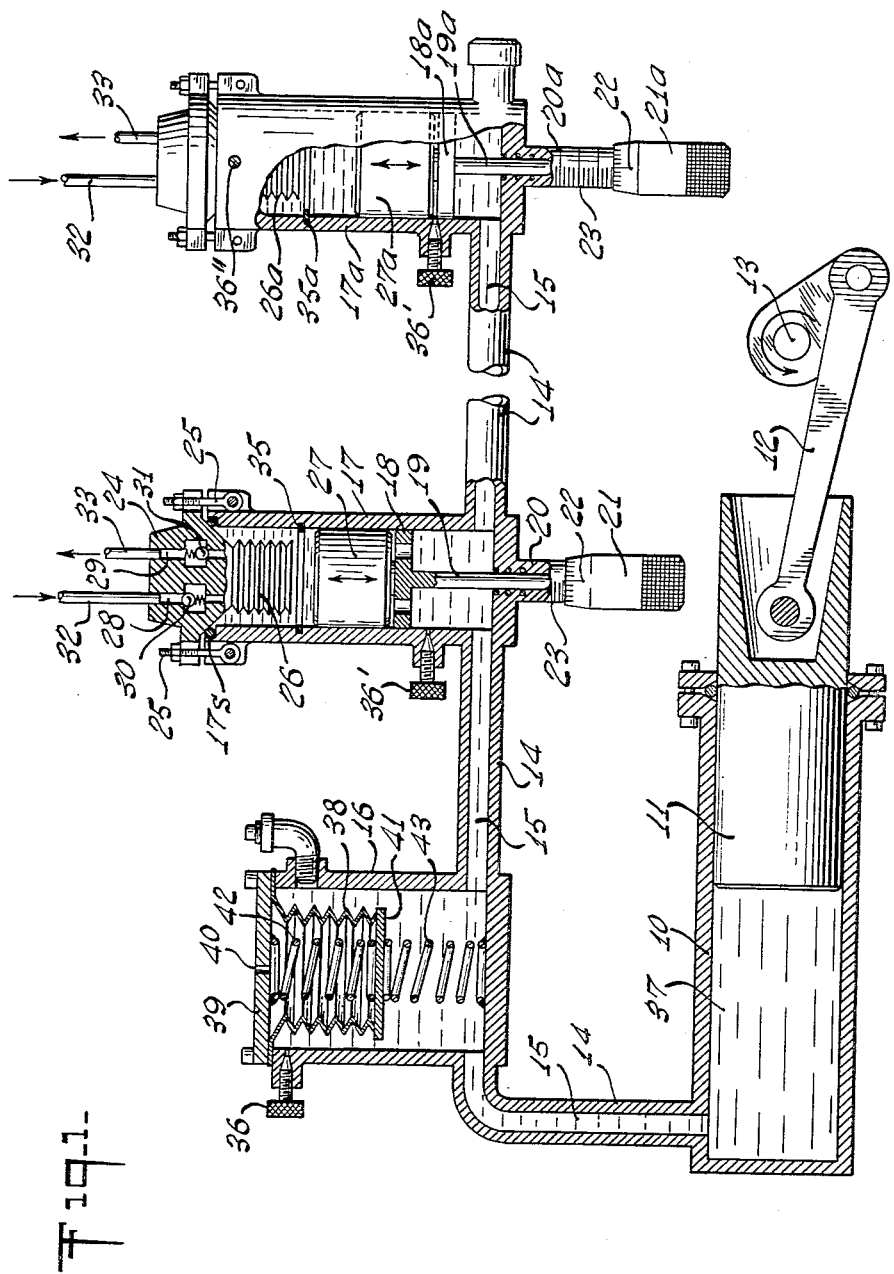

Referring now to FIG. 1, the numeral 10 denotes an hydraulic cylinder having therein a master piston or plunger 11 adapted to be reciprocated by a connecting rod 12 and crankshaft 13 which may be driven by any suitable means such as an electric motor or the like (not shown). From the inner or head end of the cylinder 10 a conduit 14 forms a passage 15 leading into the bottom end of a compensator casing 16, thence successively into the bottom portions of a pair of metering cylinders 17 and 17a. Stops in the form of disks 18 and 18a are slidably disposed in the cylinders 17 and 17a respectively, and have shanks 19 and 19a slidable in sleeves 20 and 20a projecting downward from the bottoms of the respective cylinders. The lower ends of the shanks 19 and 19a are attached to cap handles 21 and 21a rotatably mounted on the sleeves in the well-known threaded manner of micrometer calipers. The handles carry calibrating indicia 22 cooperative with indicia 23 on the sleeves, also in the general manner of micrometer calipers except that in the present device the calibrations may be either in terms of length or volume, as hereinafter set forth.

Taking the metering cylinder 17 and its appurtenances as typical of both illustrated metering units, the numeral 24 designates a head removably attached to the cylinder by means of swing bolts 25. A bellows 26 is peripherally secured at its upper end to the inner side of the head 24 and has a closed bottom end spaced from a metering piston 27, the latter being slidable in close sealing relating in the cylinder 17. Inlet and discharge passages 28 and 29, leading through the head 24 into the interior of the bellows 26, are controlled by inwardly opening and outwardly opening check valves 30 and 31, respectively. A tube 32 is provided to connect the inlet passage 28 with a supply of the fluid to be metered, and a second tube 33 similarly connects the discharge passage 29 to any desired point of delivery. The stop disk 18 is provided with holes 34 leading therethrough to admit hydraulic fluid freely to the bottom face of the piston 27.

From the above description it will be evident that when hydraulic fluid under alternating positive and negative pressures is applied to the bottom face of the piston 27 the piston will reciprocate in the cylinder 17, alternately contracting and expanding the bellows 26 in a pumping action by which successive quantities of the fluid to be metered are discharged through the passage 29 and tube 33. The volume of each quantity discharged is obviously determined by the extent of contraction and expansion of the bellows and hence by the length of stroke of the piston 27. A metallic snap ring 35, fitted in a suitable internal groove in the cylinder 17, serves as a positive upper stop to the piston's motion, while the disk 18 similarly provides a positive bottom limit to the piston stroke. Thus it will be seen that the possible stroke of the piston 27 and hence the precise quantity of liquid pumped per cycle are positively determined by the distance between the fixed upper stop 35 and the disk 18. It will further be seen that by adjustment of the vertical location of the disk 18 by means of the handle 21, the stroke of the piston 27 may be set at any desired extent within the dimensional range of the apparatus. Furthermore, the calibrations 22 and 23 will indicate the stroke setting with micrometric precision to provide precisely the desired metered liquid delivery. From the foregoing it is evident that in a specific device the adjusting calibrations may be made directly in terms of metered volume discharge, as previously mentioned.

It will be noted that each entire slave cylinder 17 is filled with fluid so that when the piston 27 is thrust upward the fluid ahead of the cylinder will compress the bellows 26 to discharge fluid from within the bellows to effect the metering operation. The pressure range in the system normally varies during a pumping cycle from a pressure above atmosphere to a pressure below atmosphere, though if desired, the pressure range in the system may be centered about a predetermined value other than atmospheric pressure by appropriately loading the metering cylinders.

As stated above, the structure and operation of the pumping parts in the second cylinder 17a are the same as those described with respect to cylinder 17, contraction and expansion of the bellows 26a being determined by the stroke of the piston 27a between the fixed upper stop ring 35a and the lower stop disk 18a which latter, in this case, is illustrated as set by means of the handle 21a at its lower extreme position to permit a greater piston stroke and consequently greater metering discharge than those permitted by the higher illustrated setting of the disk 27 in the cylinder 17.

In initial setup of the device, the disks 18 and 18a are set at their extreme bottom positions, the master piston 11 is withdrawn to its outer stroke extremity, and the entire hydraulic system is filled with a suitable hydraulic fluid 37, the system so filled including the interior of the master cylinder 10, the conduit passage 15, the metering cylinder spaces above and below their respective metering pistons 18 and 18a, and the connected interior of the compensator casing 16. During the filling operation bleeder valve 36 on the casing 16 and 36' on the metering cylinders are opened to bleed off air pockets, so that on completion of the filling and closure of the filling inlet any possible residue of air remaining anywhere in the closed hydraulic system is so small as to be operationally negligible. The upper portions of the slave or metering cylinders may be filled through ports 36". The disks 18 and 18a may then be adjusted to their desired respective stroke setting positions.

The closed hydraulic system having been charged with a fixed amount of hydraulic fluid as set forth above, it will be evident that an inward stroke of the master piston 11 will apply positive hydraulic pressure on the metering pistons 27 and 27a, driving them upward into engagement with their fixed upper stops 35 and 35a. However, to assure maintenance of positive driving pressure completely to the upper stop positions of the pistons, the displacement volume provided by the master piston 11 is slightly greater than the combined possible displacements of the pistons 27 and 27a, a condition which, if uncompensated in a closed hydraulic system, would cause a sudden excessive rise in positive pressure resulting in shock and possible rupture of the apparatus. Conversely, and particularly with a setting of either or both metering pistons at less than maximum stroke, the total volume of fluid withdrawn from the metering cylinders would be sufficiently less than the displacement of the master piston on the latter's suction stroke as to cause an undesirably high degree of vacuum or negative pressure in the system. To compensate automatically for both these conditions is the function of the apparatus enclosed in the casing 16, the structure and operation of which will now be described.

A bellows 38, of substantially greater dimensions than the metering bellows 26 is sealed between the top of the casing 16 and a head 39, the latter having a central breather opening 40. The lower end of the bellows 38 has secured thereto a sealing cap 41. A helical spring 42, preferably secured at its upper end to the head 39, extends downward within the bellows 38 into normal engagement with the inside face of the end cap 41. A second helical spring 43, resting on and preferably secured to the bottom of the casing 16, extends upwardly to engage the lower or outer face of the cap 41. The lengths of the springs 42 and 43 are such that in neutral condition, that is when the pressure in the hydraulic system is atmospheric, they may be flexed only very slightly in their engagement with the cap 41 disposed between them. The strength of the upper spring 42 is such as to prevent significant contraction of the bellows under the normal positive pressure necessary to drive the metering pistons throughout their upward pumping strokes but to yield under higher positive pressure, permitting the bellows to contract so as to accommodate the volumetric changes of the master piston stroke and thereby compensate for and cushion the increased positive pressures which would otherwise become excessive as previously noted. Similarly, the lower spring 43 is sufficiently strong to prevent substantial expansion of the bellows while the hydraulic fluid is under sufficient negative pressure to assure completion of the downward or suction strokes of the metering pistons, but is adapted to yield under further increase in negative pressure so that the bellows 38 may expand to maintain the required flow of fluid to the master cylinder 10 and thereby prevent any possibility of undue approach to the formation of a vacuum in the hydraulic system. The bellows 38 is proportioned to provide an expansive volumetric range well in excess of the combined possible displacement volumes of all the associated metering pistons. In this connection it will be understood that while the device is illustrated in FIG. 1 as employing two metering units, any practical number may be incorporated in the combination, the master pumping elements and the compensator in each case being made large enough to serve all metering units in the manner described under all conditions of metering stroke adjustments. During initial stroke settings with the device at rest, the compensator also facilitates adjustments by limiting the negative pressure against upward movements of the metering pistons. Obviously any desired changes in metered outputs may also be made while the apparatus is in operation, simply by manipulation of the handles 21, 21a, etc.

From the foregoing it will be seen that the device provides an extremely simple combination in which all metering units are actuated between accurately spaced positive stops by means of a single fixed stroke hydraulic master piston operating on a fixed volume of hydraulic fluid sealed within the system, with automatic compensation against internal negative and positive excess pressures so that the operation is smooth and precise under any desired metering and proportioning setting. Obviously the apparatus may be made of any desired size appropriate to the particular service required, and it is applicable to a wide variety of applications ranging from the metering and proportioning of chemicals to the dispensing of predetermined beverage mixtures. An example of the latter application is shown schematically in FIG. 2, which illustrates an embodiment suitable for dispensing coffee.

Figures 2, 3:
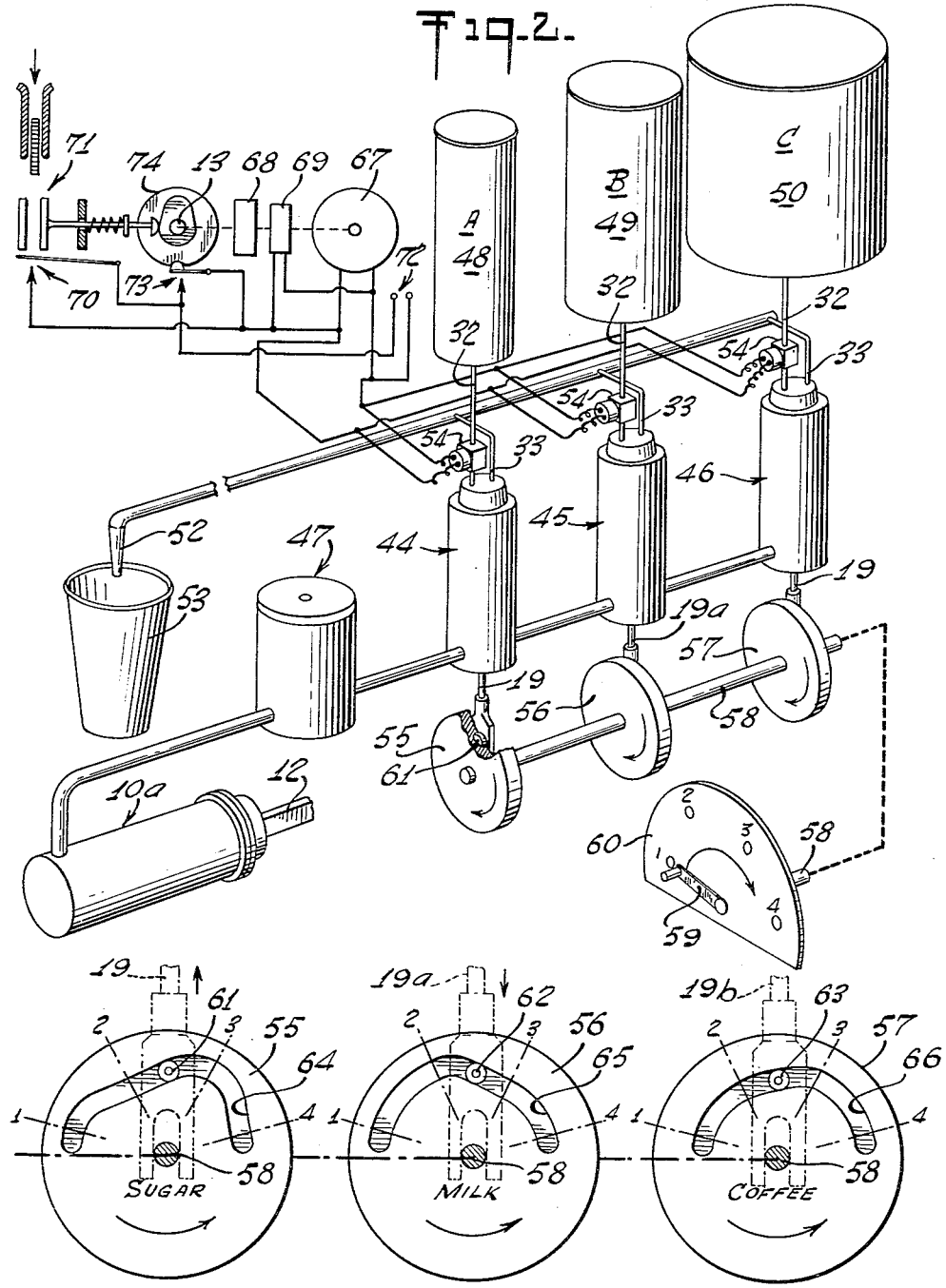

Referring to FIG. 2, the combination embodies three metering units generally designated by the numerals 44, 45 and 46, the compensator 47, and the master hydraulic pump 10a, all connected by the hydraulic conduit 14. Three elevated reservoirs 48, 49 and 50 are provided to supply sugar solution, cream, and coffee solution to the respective units 44, 45 and 46 via the inlet tubes 32. The outlet tubes 33 are all connected to a common conduit 51 adapted to deliver the beverage via a nozzle 52 to a cup 53. Small normally closed solenoid valves 54 may be interposed in the inlet tubes 32 to prevent possible flow of the component liquids through the metering units by gravity when the device is not in operation.

The exterior adjusting means for this embodiment consists primarily of three cams 55, 56 and 57 secured on a spindle 58 which is adapted to be turned to any one of four selective positions by means of a small crank 59 cooperative with a stationary dial 60. The cams are preferably of the box face type, having in their faces contoured grooves adapted to be engaged by rollers 61, 62 and 63 attached to the lower extremities of the adjusting stems 19, 19a and 19b of the metering units 44, 45 and 46 respectively, as best illustrated in FIG. 3, in which the cam combination is shown in process of being turned from Position 2 to Position 3. It will be evident that the radial distance of a groove from the spindle axis in any set position will determine the corresponding vertical location of its engaged roller and hence the stroke setting of the particular associated metering unit. Thus in Position 1, setting the groove 64 in the cam will locate the roller 61 in maximum upper position in which the stroke of the sugar metering unit 44 will be reduced to zero. In Position 1 the maximum radial spacing of groove 65 in the cam 56 also will set the cream metering unit 45 at zero output, but the relatively small radial spacing of the groove 66 in the third cam 57 in Position 1 will effect adjustment of the coffee metering unit 46 to pump a substantial quantity. Thus with the cams set in Position 1, when the device is put through an operative cycle the discharge and delivery through the slightly inclined conduit 51 consists of coffee only, for which reason Position 1 may appropriately be labelled "Coffee Black" on the dial 59.

Similarly, the contour of the various cam grooves is such as to provide "Coffee Black With Sugar" in Position 2, "Coffee With Cream No Sugar" in Position 3, and "Coffee With Sugar and Cream" in Position 4. Obviously the device may be constructed to provide adjusting positions for other proportional mixtures of the ingredients such as "Coffee Light," etc.

In the device as described above the capacity of the apparatus is preferably sufficient to complete the desired delivery in a single complete cyclic operation of the hydraulic system. This operation may be provided by various means, of which an example is shown diagrammatically in FIG. 2. Referring to the latter figure, the numeral 67 indicates an electric motor, adapted to drive the crankshaft 13 of the master hydraulic pump via a suitable reduction gear 68. The motor 67 is preferably of the well-known type incorporating a "clutch-brake" 69 adapted to release the motor and stop the output shaft when the supply current is broken. A switch 70, operable momentarily either manually or by a suitable coin controlled combination 71 provides the initial connection from a current supply source 72 to the motor 67 to start the cycle, after which a holding switch 73 is closed by a notched cam 74 on the shaft 13 and held closed until one revolution of the shaft is completed, whereupon the switch opens to stop the apparatus in initial position. In this initial position the master hydraulic pump is set at inner dead center, that is conditioned to start the suction strokes of the metering pumps as the cycle is initiated. The solenoid valves 54 are electrically connected in parallel with the motor 67, so that they are opened and held open throughout the cycle. Thus it will be seen that upon each closure of the starting switch 70 the device operates throughout a single cycle to discharge a metered quantity of beverage proportioned as to ingredients in accordance with the selected setting of the crank 59 on the dial 60.

In the embodiment illustrated in FIG. 4, in connection with which it will be understood that a single metering unit is shown as typical of any desired number of such units for which the combination may be designed, the construction throughout is the same as that of FIG. 1 except for an alternative type of inlet and outlet valving structure on the metering unit. In this variation the cylinder head 24 has a single common inlet and outlet passage 75 leading through a conduit 76 to a chamber 77 in a valve casing 78. Opposed valve seats 79 and 80 in the chamber are adapted to be alternatively engaged by a double-faced valve 81 to control inlet and outlet passages 82 and 83 respectively. The valve 81 is rockably attached via a short stem 84 to the closed head of a bellows 85 which is interiorly connected through a conduit 86 to the interior of a second bellows 87. A roller 88, attached to the closed head of the bellows 87, engages a cam 89 on the crankshaft 13. The bellows 85, the conduit 86, and the second bellows 87 are completely filled with hydraulic fluid, and the cam 89 is formed so as to normally allow the described hydraulic transducer system to hold the valve 79 in closing engagement with the inlet seat 79 during the inward stroke of the master hydraulic pump piston 11, but to shift the valve into contact with the outlet seat 80 at the beginning of the outward or negative pressure stroke of the master piston and to hold the outlet connection closed and the inlet connection open throughout that stroke. Thus it will be seen that the operation of the device is essentially the same as that previously set forth, the alternative valve operation being provided for applications such as those involving heavy viscous liquids or large volumes to be metered. The inherent resilience of the bellows components 85 and 87 are normally sufficient to keep the roller 88 in contact with the cam 89 throughout the operational cycle, but for certain conditions such as those calling for high speed operation the bellows 87 may be equipped with an internal reinforcing spring.

In the foregoing descriptions the compensations against excess positive and negative hydraulic pressures have been set forth as furnished by a single bellows and dual spring combination, but it will be understood that if desired two individual bellows and spring combinations may be provided to compensate for these two pressure conditions, the operation of the system being essentially the same as typically described. Furthermore, the compensator may be disposed at other locations in the system, particularly, for example, it may be located directly in the inner or head end of the master pump cylinder 10.

While certain embodiments of the invention have been illustrated and described, it is understood that modifications, alterations and changes may be made without departing from the true scope and spirit thereof as defined by the appended claims.

What is claimed is:

1. In a device for metering liquids, in combination, a metering pump unit including a cylinder and reciprocative means in said cylinder adapted to be hydraulically actuated for pumping a liquid to be metered by said unit, first and second positive stop means to define the operative stroke of said reciprocative means, exterior means to alter the position of one of said positive stop means in said cylinder whereby said metering stroke may be adjusted to various selected lengths, a master hydraulic cylinder, a master piston in said master cylinder, means connecting said master cylinder and said metering unit cylinder in a closed hydraulic system, a fixed volume of hydraulic fluid substantially filling said hydraulic system, means to reciprocate said master piston to apply alternating negative and positive pressures to said volume of hydraulic fluid whereby said reciprocative means in said metering unit may be reciprocated throughout said positively defined adjusted stroke, and resilient mechanical means operable within said closed hydraulic system to compensate for differences in operative displacement between said master piston and said stroke-adjusted reciprocative means, whereby excessive negative and positive pressures in said hydraulic system are prevented.

2. The combination according to claim 1 wherein said adjusting means includes exterior manually operable shifting means and rigid means extending into said closed system in slidable sealed relation and connecting said exterior shifting means to said one of said positive stop means in said cylinder of said metering pump unit.

3. In a metering device, in combination, an hydraulically operable reciprocating metering pump, first and second mechanical stops adapted to define positively the operative stroke of said metering pump, a reciprocating master hydraulic pump, means connecting said pumps in a closed hydraulic system, a volume of hydraulic fluid substantially filling said system and adapted to transmit actuating displacements from said master pump to said metering pump, means operable from outside said closed system to alter the spacing of said positive terminal stops for selectively adjusting said stroke of said metering pump, and means in direct communication with said volume of hydraulic fluid to compensate for differences in operational displacement between said master pump and said stroke-adjusted metering pump.

4. The combination according to claim 3 wherein said master pump has a fixed volume displacement greater than the maximum adjusted hydraulic fluid volume displacement in said metering pump.

5. In a metering and proportioning device, in combination, a plurality of hydraulically operable reciprocating metering pumps each including spaced mechanical stops for positively determining the length of pumping stroke therein, a master reciprocating hydraulic pump, means connecting said master pump in direct fluid communication with all said metering pumps in a closed hydraulic system, said master pump having a cyclic displacement at least equal to the combined maximum cyclic hydraulic operating displacements of all said metering pumps, a volume of hydraulic fluid substantially filling said closed system, means to drive said master pump to establish alternating negative and positive essential operative pressures in said fluid whereby said metering pumps may be hydraulically actuated throughout said positively determined strokes, individual means to adjust the spacing of said mechanical stops in each of said metering pumps whereby the metered outputs of said metering pumps may be selectively proportioned, and expansible and contractible mechanical volumetric compensating means operative in said closed hydraulic system to limit increase of negative and positive pressures therein beyond said essential operative pressures.

6. In a metering and proportioning device, in combination, a plurality of hydraulically operable reciprocating metering pumps each including spaced mechanical stops for positively determining the length of pumping stroke therein, a master reciprocating hydraulic pump, means connecting said master pump in direct fluid communication with all said metering pumps in a closed hydraulic system, said master pump having a cyclic displacement in excess of the combined maximum hydraulic operating displacements of all said metering pumps, a volume of hydraulic fluid substantially filling said closed system, means to drive said master pump to establish alternating lower and higher essential operative absolute pressures in said fluid whereby said metering pumps may be hydraulically actuated throughout said positively determined strokes, individual means to adjust the spacing of said mechanical stops in each of said metering pumps whereby the metered outputs of said metering pumps may be selectively proportioned, and volumetric compensating means automatically operable in said closed hydraulic system to limit increase of said higher absolute pressure and decrease of said lower absolute pressure beyond said respective essential operative pressures.

7. The combination according to claim 6 wherein each of said adjusting means includes a stem of one of said mechanical stops extending outward in slidable sealed relation with said closed hydraulic system, and exterior means to move said stem and stop inwardly and outwardly to effect said spatial adjustment.

8. The combination according to claim 6 wherein each of said adjusting means includes a stem of one of said mechanical stops extending outward in slidable sealed relation with said closed hydraulic system, and exterior substantially micromatic manually operable calibrated means to move said stem and stop inwardly and outwardly to effect said spatial adjustment.

9. In a metering device for liquids, in combination, a metering unit comprising a cylinder, a pumping bellows extending within said cylinder and having an inner end, a piston in said cylinder and spaced from the inner end of said bellows, said piston being in reciprocative sealing relation with said cylinder, a head secured on said cylinder and secured to the outer end of said bellows in peripheral sealing relation, said head forming with the interior of said bellows a pumping chamber, conduit means to provide inlet and discharge of metered liquid to and from said chamber through said head, valve means to control said inlet and discharge, a fixed stop in said cylinder between said piston and said head and adapted to be engaged by said piston to positively limit the movement of said piston and contraction of said bellows toward said head, a second stop in said cylinder beyond said piston and adapted to be engaged by said piston to positively limit the movement of said piston and expansion of said bellows away from said head, exterior calibrated means to change the linear position of said second stop in said cylinder whereby the length of stroke of said piston between said two positive stops may be selectively adjusted to quantitatively adjust the metered discharge of said liquid from said pumping chamber, a reciprocating hydraulic master pump having a volume displacement at least equal to the maximum volumetric displacement of said piston in said metering unit, means connecting said master pump to said metering unit cylinder and piston in a closed hydraulic system, a fixed volume of hydraulic fluid in and substantially filling said closed system, means to drive said master pump to establish alternating negative and positive pressures in said fluid whereby said piston may be reciprocated throughout said adjusted stroke between and into contact alternately with said two positive stops, and means automatically operable in said closed hydraulic system to compensate for differences in displacement between said master pump and said stroke-adjusted piston in said metering unit.

10. A device according to claim 9 wherein said automatic compensating means includes a bellows adapted to expand under negative pressure in said hydraulic fluid and to contract under positive pressure in said fluid, and spring means to substantially limit said expansion and contraction to conditions respectively of negative and positive pressures in excess of operative pressures essential to said actuation of said metering unit piston between said positive stops.

11. A device according to claim 8 wherein said conduit means from said pumping chamber includes means forming a valve chamber having opposed inlet and discharge valve seats, a common valve adapted to engage either of said seats, and hydraulic means to move said common valve alternately into engagement with said two seats in timed relation to the reciprocations of said master pump.

References Cited in the file of this patent

UNITED STATES PATENTS

| | | |
|---|---|---|
| 2,539,615 | Fox et al. | Jan. 30, 1951 |
| 2,737,978 | Eberg | Mar. 13, 1956 |
| 2,778,534 | Ramsey | Jan. 22, 1957 |
| 2,800,152 | Sloier | July 23, 1957 |
| 2,840,274 | Arnett et al. | June 24, 1958 |
| 2,957,484 | Nordin | Oct. 25, 1960 |
| 2,963,202 | Dickinson et al. | Dec. 6, 1960 |
| 2,965,114 | Hardin | Dec. 20, 1960 |